United States Patent
Li et al.

(10) Patent No.: US 11,656,353 B2
(45) Date of Patent: May 23, 2023

(54) OBJECT MEASUREMENT USING DEEP LEARNING ANALYSIS OF SYNTHETIC APERTURE RADAR BACKSCATTER SIGNATURES

(71) Applicant: Orbital Insight, Inc., Palo Alto, CA (US)

(72) Inventors: Xin Li, Santa Clara, CA (US); Matthew Dunseth Wood, Palo Alto, CA (US)

(73) Assignee: Orbital Insight, Inc., Palo Alto, CA (US)

( * ) Notice: Subject to any disclaimer, the term of this patent is extended or adjusted under 35 U.S.C. 154(b) by 402 days.

(21) Appl. No.: 16/599,036

(22) Filed: Oct. 10, 2019

(65) Prior Publication Data

US 2021/0109209 A1  Apr. 15, 2021

(51) Int. Cl.
*G01S 13/90* (2006.01)
*G01S 7/41* (2006.01)

(52) U.S. Cl.
CPC .......... *G01S 13/9027* (2019.05); *G01S 7/417* (2013.01)

(58) Field of Classification Search
CPC .............................. G01S 13/9027; G01S 7/417
See application file for complete search history.

(56) References Cited

U.S. PATENT DOCUMENTS

| | | | |
|---|---|---|---|
| 10,042,048 B1 * | 8/2018 | Moya | G01S 13/9023 |
| 10,672,139 B2 * | 6/2020 | De Franchis | G06V 20/176 |
| 2019/0258899 A1 * | 8/2019 | Coogan | G06T 7/90 |
| 2020/0258296 A1 * | 8/2020 | Pennings | G06T 5/002 |
| 2021/0390673 A1 * | 12/2021 | Ban | G06T 7/194 |

OTHER PUBLICATIONS

Cui, Z. et al., "D-ATR for SAR Images Based on Deep Neural Networks," Remote Sensing, Apr. 13, 2019, vol. 11, No. 906, pp. 1-17.
European Patent Office, Extended European Search Report and Opinion, EP Patent Application No. 20199570.1, dated Feb. 5, 2021, ten pages.
Kang, M. et al., "Contextual Region-Based Convolutional Neural Network with Multilayer Fusion for SAR Ship Detection," Remote Sensing, vol. 9, Aug. 20, 2017, pp. 1-14.
Lu, C. et al., "Ship Classification in High-Resolution SAR Images via Transfer Learning with Small Training Dataset," Sensors, Dec. 24, 2018, vol. 19, No. 63, pp. 1-16.

(Continued)

*Primary Examiner* — Peter M Bythrow
*Assistant Examiner* — Nazra Nur Waheed
(74) *Attorney, Agent, or Firm* — Fenwick & West LLP (57) ABSTRACT

A system is configured to receive synthetic aperture radar (SAR) backscatter signatures of a geographical area including the object of interest from a SAR device. The system also extracts feature vectors from the SAR backscatter signature based on the intensity values of the SAR backscatter signature. The system inputs the one or more feature vectors into a neural network model. The system receives, as output from the neural network model, coordinate values indicating one or more visual features of the object of interest. Using these coordinate values, the system determines one or more measurements of the object of interest.

19 Claims, 6 Drawing Sheets

(56) References Cited

OTHER PUBLICATIONS

Novak, L.M et al., "High Resolution Radar Target Identification," IEEE, Oct. 1992, pp. 1048-1057.

Soenin, S., "Deep Learning and SAR Applications: A short overview of advancements and challenges in earth observation applications," Towards Data Science, Mar. 29, 2019, eight pages, [Online] [Retrieved on Sep. 10, 2021] Retrieved from the Internet <URL: https://towardsdatascience.com/deep-learning-and-sar-applications-81ba1a319def>.

Xie, Y. et al., "A Novel Convolutional Neural Network Architecture for SAR Target Recognition," Journal of Sensors, May 5, 2019, Article ID 1246548, pp. 1-9.

Zhao, P. et al., "Multi-Stream Convolutional Neural Network for SAR Automatic Target Recognition," Remote Sensing, Sep. 14, 2018, vol. 10, No. 1473, pp. 1-22.

\* cited by examiner

OBJECT MEASUREMENT USING DEEP LEARNING ANALYSIS OF SYNTHETIC APERTURE RADAR BACKSCATTER SIGNATURES

TECHNICAL FIELD

This disclosure relates generally to processing of sensor data, and, in particular, to object measurement using deep learning analysis of synthetic aperture radar (SAR) backscatter signatures.

BACKGROUND

In many industries, organizations may utilize various facilities for the purposes of their business. These facilities may assist in various logistical operations, such as storage of resources, production of products, vehicle storage, customer parking, and so on. These facilities may change dynamically over time, with these changes visible to an observer external to the facility. An organization may have a large number of these facilities as well. To determine the current state of these facilities, an organization may hire an observer to visit each facility to determine the state. For example, an organization may store liquids or other materials in a floating roof container. By observing the height of the floating roof of the container, an observer may be able to determine the filled volume of the container. This method is inefficient as it requires physical relocation of the observer to the premises of multiple facilities in order to make the observations.

Instead, an aerial (or satellite) platform capable of taking visual photographic images of the facility may be employed, allowing an observer to make the determinations of the current state of the facility, such as the height of the floating roof, a number of parked vehicles, an amount of stacked pallets of materials, etc., without having to visit the facility itself.

This method also has its challenges, as optical imagery of a facility may not always be available due to cloud cover and other obstructions (e.g., smoke from a fire, reflections, night time or low light conditions). As the state of a facility may change frequently, not being able to observe the facility at certain times can lead to incorrect reports that are generated. Furthermore, it may not be feasible for an observer to make measurements for each and every facility quickly.

Therefore, what is lacking is a configuration for quickly measuring objects using sensor data that is not hindered by obstructions.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments are systems, methods and/or computer program products (e.g., a non-transitory computer readable storage media that stores instructions executable by one or more processing units) for a system for joint modeling of object population estimation using sensor data and distributed device data.

In one example embodiment, the system includes a synthetic aperture radar (SAR) device to capture SAR backscatter signatures of objects of interest. The system also includes an object measurement system configured to receive the SAR backscatter signatures of a geographical area including the object of interest from the SAR device. These SAR backscatter signatures are representations of the reflected radar signals received by the SAR device from emitted radar signals generated the SAR device. In one embodiment, the SAR backscatter signatures include a two dimensional array of intensity and phase values, and may be represented in an image. Each value in the array represents intensity and phase of a reflected radar signal. The system also extracts one or more feature vectors from the SAR backscatter signature based on the values of the SAR backscatter signature. The system inputs the one or more feature vectors into a neural network model. The neural network model is trained using training data. The training data includes one or more training sets, with each training set including labeled SAR backscatter signatures of objects of interest. The system receives, as output from the neural network model, coordinate values indicating one or more visual features of the object of interest. Using these coordinate values, the system determines one or more measurements of the object of interest.

Figure 1:
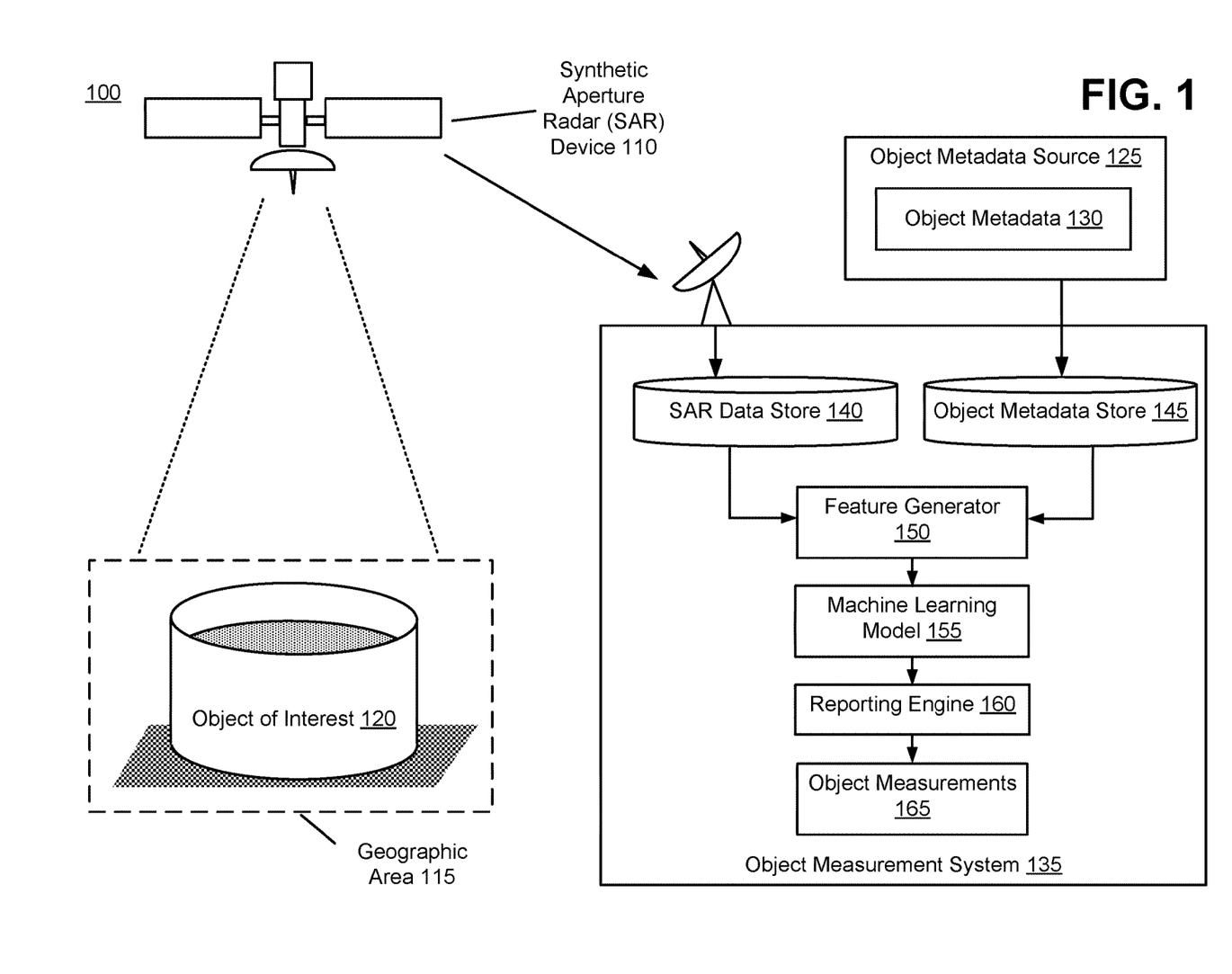
FIG. 1 illustrates an example system for object measurement using deep learning analysis of synthetic aperture radar (SAR) backscatter signatures, in accordance with an embodiment.

Using such a system, measurements for an object of interest can be gathered at regular intervals with a more guaranteed observance cadence (i.e., a more regular cadence compared to a traditional system, or a cadence having a defined confidence interval), as low light or obstructed scenarios (e.g., clouds, fog, smoke) do not prevent the SAR device from capturing backscatter signatures of the object of interest 120. The use of the SAR device allows for more accurate measurement of the height of the object, and no off-nadir image is necessary as with the case of a visible light image of the object. The use of the machine learning model also avoids errors from measurement using simpler methods such as peak brightness measurement. The output from the model can also be used to train an optical/visible light imaging system as well, reducing the need for human labeling of training data.

Example System Environment

Figure (FIG.) 1 illustrates an example system for object measurement using deep learning analysis of synthetic aperture radar (SAR) backscatter signatures, in accordance with an embodiment. The example system environment shown in FIG. 1 may include a synthetic aperture radar (SAR) device 110 to capture sensor data of an object of interest (AOI) 120 at a geographic area 115, an object metadata source 125, and an object characteristic estimation system 135 to generate one or more object measurements.

The SAR device 110 is a sensing device that captures radar backscatter data from emitted radar signals directed to a target location, such as the geographic area 115. In one embodiment, the SAR device 110 emits radar signals sequentially at a constant time and phase frequency or changing time and phase frequencies and directed at the target location. While the SAR device 110 emits the radar signals, it's carrier (i.e. aircraft) continues to move over the target location. It will also receive the echoes from the emitted radar signals sequentially, i.e., in the order that they were emitted, as they are reflected from the target location back to the SAR device 110 (or another receiver device). The SAR device 110 may angle its emitter to point at an object, such as object of interest 120, while it moves over the target location.

The SAR device 110 takes the detected echoes and generates a set of backscatter signatures based on analyzing the reflected radar signals. The backscatter signatures describes an intensity of a reflected echo for each portion of the target location, and may be represented as a two dimensional image, with intensity values of each pixel of the image indicating the intensity of the reflected echo at a portion of the target location corresponding to the pixel location. Each portion of the target location may have different objects. Some objects within each portion may reflect the radio signals more strongly, either due to their material being more reflective or the incidence angle of the radar signal to the surface of the object being closer to the surface normal, while other objects may reflect the signals less strongly. The distance from the SAR device 110 to the object may also affect the intensity of the reflected signal, with closer objects having a higher intensity of reflected signal. By analyzing the echoes from multiple sequentially emitted signals emitted by the SAR device 110 while it moves over the target location, the SAR device 110 is able to synthesize a resulting backscatter signature that has a higher resolution than that generated using a single emitted radar signal. The effective aperture of the SAR device 110 is proportional to how many sequential radar signals it emits over how long a distance of movement. In one embodiment, the backscatter signatures may be divided into two or more sets, each capturing a range of wavelengths. Additional details regarding the generation of the backscatter signatures is are provided below with reference to FIG. 2-3.

In addition, the SAR device 110 may determine additional metadata regarding the object using the time of flight, direction, wavelength, altitude of the SAR device 110, and/or phase of the reflected radar signal. This information allows it to determine the distance to the object from which the echo is reflected. For example, the measured time of flight of the reflected radar signal allows the SAR device 110 to determine the round trip distance of the radar signal, and thus the distance to the object. The SAR device 110 may also determine a velocity (e.g., via the Doppler effect), surface normal, and other information regarding the objects at the target location.

The backscatter signatures, along with any metadata is transmitted by the SAR device 110 to the object measurement system 135. The SAR device 110 may also transmit metadata regarding itself, such as the time of capture, geospatial location, angle of the radar emitter/sensor with regards to the surface normal, range of wavelengths emitted/captured, synthetic aperture size, and so on.

The SAR device 110, unlike an imaging device capturing signals in the visible spectrum, can penetrate adverse weather and atmospheric conditions, such as clouds, smoke, and so on. Clouds may include any atmospheric suspension of liquid or frozen water or chemical particles, and may be present in the atmosphere at varying altitudes. Smoke may include any collection of airborne solid/liquid particulates and gases which are emitted during combustion/pyrolysis of various materials, such as via vehicle emissions, burning of organic matter, etc. Furthermore, it has a significant range due to good propagation characteristics of certain radar frequencies through the atmosphere, in comparison to a visible-light system. Thus, it can be advantageously used in situations where visible light imaging cannot capture an image of an object. For example, in cases where clouds and/or smoke obscure an object, the SAR device 110 may be able to generate a backscatter signature from captured echos of radar emissions in contrast to a visible light imaging system, which can only capture an image of the obscuring matter. As another example, as the SAR device 110 may be able to capture objects from a greater range than a visible light system, it can gather data about a larger area for a similar path of movement of the device, compared to a visible light imaging device.

In one embodiment, the SAR device 110 is an aerial device, such as a satellite, airplane, helicopter, or drone (which carry the actual radar emitter/receiver within). In another embodiment, the SAR device 110 may be a land-based device, such as a vehicle with a mounted radar emitter/receiver, a stationary radar station, etc. In another embodiment, the SAR device 110 is a phased array, virtual phased array, or single radar antenna of larger non-synthetic aperture.

The geographic area 115 is a target location area on any large area surface, such as a surface of a planet where the emitted radar signals from the SAR device 110 may transmit (through any density of atmosphere, including low atmospheric density. Located on or within the cone the geographic area 115 to the SAR transmitted signal source are one or more objects of interest 120, which are any three-dimensional elements that can reflect radar signals emitted from the SAR device 110. These objects of interest 120 may include various facilities owned by an organization for which measurements of the facilities are requested. For example, a facility may include a floating roof storage container, and the measurement to be obtained is the current level/height of the floating roof, which indicates the current filled liquid/material volume within the floating roof storage container. Such a floating roof container is illustrated in the example in FIG. 1. Other examples of facilities/objects and respective measurements may include a car park and number of cars, a open-air storage facility and number of stored units, a harbor and number of containers, a bay and number of ships, an airport and number of airplanes, a road and number of moving vehicles, and so on. Additional objects of interest 120 may be considered as well, so long as their measurements can be determined via the radar signals from the SAR device 110.

The geographic area 115 may be defined by a closed boundary on the land surface. The closed boundary itself may be defined using various connected geographic markers, which may be indicated using geographic coordinates, such as longitude and latitude indicators. Alternatively, the geographic area 115 may be defined by a set of vectors describing the closed boundary. In another embodiment, the geographic area 115 is defined using a cartographical indicator, i.e., a commonly, conventionally, administratively, or legally agreed upon indicator of a bounded area on a land surface. For example, these cartographic indicators may include a point of interest, landmark, address, postal code, city/town/village, metropolitan area, country, province/county, neighborhood, unincorporated area, and so on. For example, the geographic area 115 may be indicated using a postal code, which is defined by a postal service of a country.

The boundaries of the geographic area 115 may be specified to the SAR device 110 using any one of the above methods by the object measurement system 135, after which the SAR device 110 platform may move near the location of the geographic area 115 and capture the backscatter signatures for that area.

In one embodiment, the geographic area 115 is not a location on the land surface, but a closed three-dimensional space at any location. It may be defined using a plurality of three dimensional coordinates which are connected together using planar surfaces, or may be described in terms of geometric shapes, using inputs that may overlap with the inputs used in the two dimensional identified areas.

The object metadata source 125 is a source of object metadata 130 for the objects of interest 120 captured by the SAR device 110 at the geographic area 115. The object metadata source 125 transmits this information to the object measurement system 135. Object metadata 130 regarding an object may include attributes regarding the object. For example, in the instance of a floating roof container, this may include the diameter and height of the floating roof container. Additional details may include the structural material of the container, material being stored, any structural protrusions from the container, model number of the container, tilt angle of container walls if any, geographic location of the container, local terrain height of the container, and so on. For other objects, different metadata would be included, such as surface area of the object, type of material being stored, type of the object, shape of the object, and so on.

The object metadata 130 may be sourced from public records, LIDAR (Light Detection and Ranging) sources, visible light images of the object (e.g., satellite images), owners of the objects, and so on.

The object measurement system 135 generates object measurements 165 of the objects of interest 120 using the backscatter signatures from the SAR device 110 as well as the object metadata 130 from the object metadata source 125. In one embodiment, the object measurement system 135 includes the SAR data store 140, object metadata store 145, feature generator 150, machine learning model 155, and reporting engine 160.

The SAR data store 140 includes data received from the SAR device 110 for various objects of interest 120. This includes backscatter signatures captures for objects of interest 120 as well as any optional metadata regarding the object of interest 120 and/or the SAR device 110, such as a geolocation of the SAR device 110, incidence angle of the SAR device 110, and so on.

The object metadata store 145 receives the object metadata 130 from the object metadata sources 125 which include metadata for the objects of interest 120 for which backscatter signatures have been captured and stored in the SAR data source 140. For example, the object metadata may include a diameter and height of the object of interest 120.

The feature generator 150 generates one or more features using the data within the SAR data source 140 and the object metadata store 145. These features are inputted into the machine learning model 155 to generate one or more coordinate values for the object of interest 120, which are subsequently used to generate the object measurements 165 for the object of interest 120.

In one embodiment, for each backscatter signature or set of signatures received or requested for analysis, the feature generator 150 extracts the diameter of the object of interest 120 from the object metadata store 145 for the object of interest 120 and uses this as an input feature. To find the diameter that corresponds to the object of interest 120 captured in a backscatter signature, the feature generator 150 may determine the geographic coordinates of the object captured in the backscatter signature. This may be achieved by determining the geolocation of the SAR device 110 when it captured the backscatter signature using metadata provided by the SAR device 110 for the backscatter signature, and then triangulating the location of the target of the backscatter images using the known altitude of the SAR device 110 and the incidence angle of the backscatter signature. The feature generator 150 may then search the object metadata store 145 for a diameter of an object of interest 120 with the nearest geographic coordinates.

The feature generator 150 may also input the incidence angle of the SAR device 110 when capturing the signatures as an input feature. The incidence angle may be the angle between the surface normal at the target location and the direction of the SAR device 110 at the target location.

Finally, the feature generator 150 may input as features the backscatter signature of the object of interest 120. In one embodiment, the feature generator 150 may divide the backscatter signature into multiple channels. The backscatter signature may comprise an array of intensity values, each corresponding to a different coordinate location. Each intensity value may include multiple channels, each corresponding to a different range of wavelengths (similar to color channels in visible light) or different polarizations (e.g. vertically/horizontally transmitted and horizontally/vertically received). Alternatively, each intensity value may be a large bit value (e.g., 32 bits) and the feature generator 150 "decompresses" the intensity value by splitting it into multiple channels, each corresponding to a subset of the range of values possible for that intensity value. Thus, if the intensity value is a high number, and it were separated into three channels, then a "high" channel would include a unsaturated number, while the "med" and "low" channels might indicate a saturated value. The feature generator 150 may separate each channel into a separate backscatter signature (a "subset SAR backscatter signature").

Optionally, the feature generator 150 may input additional features into the machine learning model 155. These may include optical images of the object of interest 120, along with other metadata of the SAR device 110 and other measurements of the object metadata 130. For example, the feature generator 150 may input a categorical value indicating the type of material of the object of interest 120, or a radar reflectivity measurement for the material of the object of interest 120. As another example, the geolocation of the object of interest 120 may be transmitted to the machine learning model 155 to improve its recognition of the location of object.

In addition, in some embodiments, the feature generator 150 may perform additional pre-processing on the images representing the SAR backscatter signatures. The feature generator 150 may stretch and scale the images to a normalized size. The feature generator 150 may stretch the image based on the incidence angle. A larger incidence angle indicates an SAR device 110 that is viewing the object of interest 120 at a larger off-nadir angle and therefore the image may be less stretched in the across-track direction which is perpendicular to SAR device moving direction from if the SAR device 110 were overhead (at the nadir). The feature generator 150 may also scale the image based on the diameter for the object of interest 120 so that each image has a uniform size of the object.

The feature generator 150 may employ a bounding box algorithm to crop the images to those where a likely object exists, i.e., such that the object is within a central portion of the image of the SAR backscatter signature. For example, the image may be cropped such that the center of the object may be within a threshold value/percentage of the center of the image. Such an algorithm may be trained using examples with no object and with objects, along with inputs such as the location of the container, terrain height, and so on. The feature generator 150 may darken or brighten the images to normalize them to a specific range, or may modify the brightness of an image inversely in proportion to the radar reflectivity of the material of the object of interest 120.

The machine learning model 155 receives the features from the feature generator 150 and generates coordinates corresponding to points on the object of interest 120 with the coordinates indicating a distance of that point from the SAR device 110.

In one embodiment, in the case of a floating roof container, the coordinates correspond to a closest point on the bottom of the container to the SAR device 110, a closest point to the top of the container to the SAR device, and a furthest point from the SAR device 110 of the lid. The reason for having the furthest point for the lid is that the closest point of the lid would be obscured by the walls of the container as the lid or roof is recessed within the container. As these coordinates fall along a single axis, only 4 values are needed to describe them, a vertical axis coordinate, and horizontal axis coordinate values indicating the location of each of the points described above. The values of the coordinates may be relative to image of the backscatter signature, such that each coordinate may be represented by at most two values, each representing an axis on the image. Alternatively, the coordinates may be represented by a value indicating a distance from that point to the SAR device 110, or may be converted by the machine learning model 155 to such a distance value.

To train the machine learning model 155, a training system may feed the machine learning model 155 one or more sets of training data. The training data may include labeled backscatter signatures of objects of interest 120. The labels indicate the coordinates of interest for which the machine learning model 155 is configured to output. For example, they might be the bottom, lid, and top point coordinates described above. The labels may be generated using human input. Alternatively, a separate machine learning model trained on visible light images may be used to determine the labels using corresponding visible light images of the same objects (when no obstructions exist). The separate machine learning model may be trained to measure the fill levels or other measurements from optical images using the area of the shadows cast by the objects.

The training set may also include backscatter signatures where no object is present, so that the model can be trained to recognize situations where no object is in the signatures. In such a case the machine learning model 155 may output zero values or null values for the coordinates. In one embodiment, the machine learning model 155 is also configured to predict the center of the object of interest, such as the floating roof container. If the machine learning model 155 cannot determine the center, then this may indicate that no object exists in the signature.

The training set may also include backscatter signature images that have been flipped and/or rotated to simulate different types of sensors. The images in the training set may be resized and scaled to indicate different distances to the object and different incidence angles. The images may be shifted to show an inaccurate georegistration. Noise, speckle, and shifted phases may be added to the images to simulate increased noise (e.g., lower signal to noise ratios).

The machine learning model 155 may be trained using regression loss (e.g., using mean squared/absolute error between the actual and predicted results) in order to arrive at a trained model with at least a threshold accuracy (e.g., within a threshold distance of the actual coordinate).

If the object has a tilt on the normal axis (e.g., upwards from the ground), the machine learning model 155 also may receive information regarding the tilt angle of the object in order to determine its coordinates. For example, if the object were tilted towards the SAR device 110, the distance measurement of the top of the object would be closer to the SAR device 110 in comparison to a non-tilted object, rendering any height calculation to be inaccurate. Therefore, the tilt amount is accounted for in order to cancel it out in order to determine the height of the object. In many cases, a floating roof container will have container walls that are normal (i.e., at a 90 degree angle) relative to the plane of the surface on which the container is located, and thus will have no tilt.

If the object is not radially symmetrical, such as with the case of the cylinder of a floating roof container, additional information regarding the orientation of the object, and/or other characteristic of the object, may be input into the model, or the input may be rotated to have a standard orientation.

After generating the output coordinates, a verification may be performed. During verification, the machine learning model 155 may check to see if one or more intensity values at predicted coordinates within the backscatter signatures exceeds a threshold value, e.g., by measuring the pixel values within the backscatter signature. If not, the machine learning model 155 may determine that the backscatter signature does not contain an object of interest, as the object of interest should have an intensity value exceeding the threshold. If the machine learning model 155 has still determined coordinates for this signature, then those coordinates may be dropped, and the machine learning model 155 may indicate that no object exists in the signature or failure in measurement due to image quality. In one embodiment, to determine the threshold value, correlations between the backscatter signature values and measurement error between the machine learning model 155 prediction and human labeling are determined, and the threshold is selected as a minimum value below which the predictions from the machine learning model 155 and the human labeling do not agree well (e.g., bottom 5% of correlations).

The reporting engine 160 receives the coordinate values output by the machine learning model 155 to generate the object measurements 165. The object measurements 165 measure various characteristics of the object of interest 120. In the case of a floating roof container, the measurements may include a height and fill level of the container. To compute the height H, the reporting engine 160 may follow the equation:

$$H = (D_{bottom} - D_{top}) / \cos(\theta) \tag{1}$$

Where $D_{bottom}$ and $D_{top}$ represent modified versions of the bottom and top coordinate points described above. $D_{bottom}$ is a distance between the SAR device 110 and the bottom point, while $D_{top}$ is a distance between the SAR device 110 and the top point. These may be computed based on a simple distance algorithm. For example, the geolocation of a point can be determined based on knowledge of the geolocation of the object which may be stored in the object metadata store 145. The geolocation of the SAR device 110 as well as its height may be determined from the information in the SAR data store 140. Using this information, the distance between the SAR device 110 and the point can be computed. The angle $\theta$ is the incidence angle.

To compute the fill level or rate FR, the reporting engine 160 may follow the equation:

$$FR = ((D_{bottom} - (D_{lid} + d^* \sin(\theta)) / ((D_{bottom} - (D_{top})) \tag{2}$$

Where d is the diameter of the container, $D_{bottom}$ and $D_{top}$ are as above, and Dud is the distance from the point on the lid as described above to the SAR device 110. The angle $\theta$ is the incidence angle.

The reporting engine 160 may also compute other measurements for the object, depending upon the coordinate values that are received. For example, the reporting engine 160 may report a volume of the floating roof container based on the knowledge of the fill rate and the diameter. As other examples, the reporting engine 160 may report an area, width, number of elements present, circumference, orientation, shape, etc., of an object of interest 120. The measurements would be generated based manipulation of the coordinate values output by the machine learning model 155 for the object of interest 120. After generating these object measurements 165, the object measurement system 135 may transmit the measurements to a requesting system, such as the client system of an organization or entity that owns the objects of interest 120.

Although the description above separates the generation of the coordinate values and the generation of the measurements into two separate components, i.e., the machine learning model 155 and the reporting engine 160, in other embodiments both the generation of the coordinate values and the measurements may be performed by the machine learning model 155. In such a case the machine learning model is further trained using training data that includes the resultant measurements of the objects of interest, rather than just the coordinate values for these objects.

Although the description above is primarily made in reference to floating roof containers, the system here can be applied to other objects as well. Additional details regarding the system are described below with regards to, for example, FIGS. 2-5.

Example Backscatter Signatures

Figure 2:
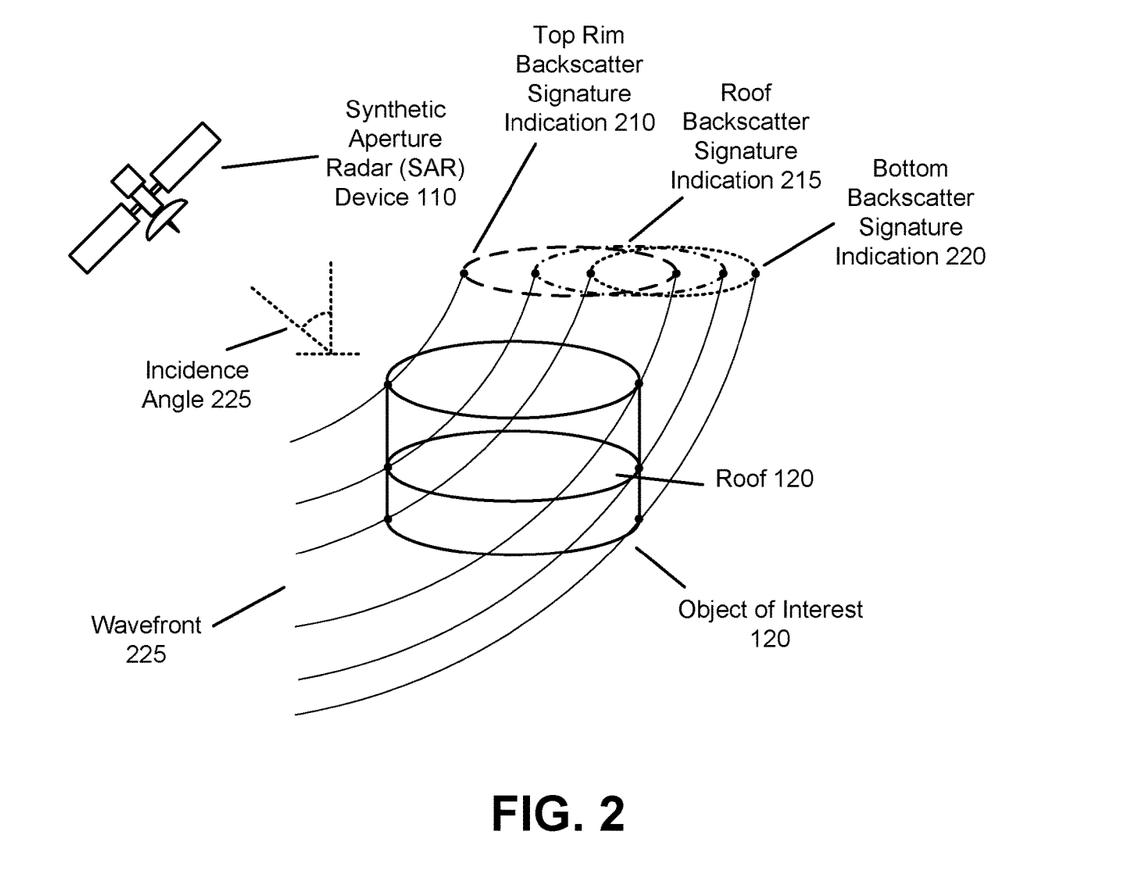
FIG. 2 is an illustration of model for a SAR signal incident upon an object and its resulting backscatter signature, according to an embodiment.

FIG. 2 is an illustration of model for a SAR signal incident upon an object and its resulting backscatter signature, according to an embodiment. As illustrated, the SAR device 110 transmits radar signals to the object of interest 120 at an incidence angle 225. This results in one or more wavefronts 225 directed at the object of interest 120. These wavefronts 225 may arrive at different times, and may represent different emissions of radar signals from the SAR device 110. The wavefronts reflect off various points on the object of interest 120. As shown, the object of interest 120 is a floating roof container. With this container, a backscatter signature with three distinct indications are generated, one for each of the lid, roof, and bottom of the container. These are indicated by the backscatter signature indications 210, 215, and 220, respectively. Although a circular pattern is shown for the backscatter signature indications 210-220, in practice the backscatter signature may only roughly resemble a circular pattern, as not all portions of the top, lid, and bottom of the container are visible, and therefore reflective, from the viewpoint of the SAR device 110. Thus, some portions of the backscatter signatures may be missing from that shown here.

Depending upon the incidence angle 225 of the SAR device, the various backscatter signature indications 210-220 may be closer or further away from each other in distance when represented in the backscatter signature for the object of interest 120. This is because a smaller incidence angle 225 means that the plane of the wavefronts 225 will be closer to an orthogonal of the surface normal (i.e., closer to 90 degrees to the surface normal) so that the signature indications that are separated vertically are further apart. If the incidence angle is larger, the opposite is true.

Figure 3:
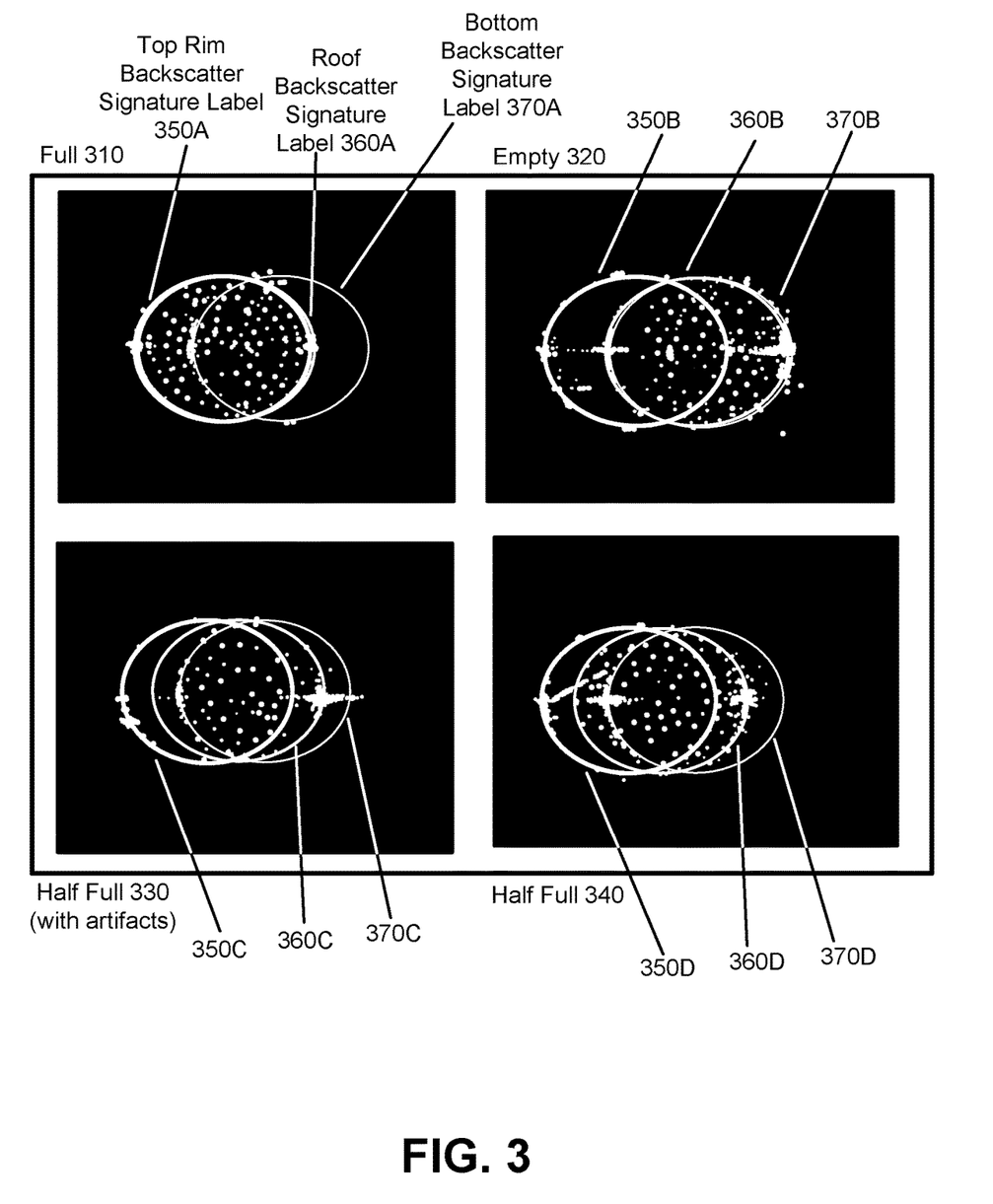
FIG. 3 is an illustration of multiple SAR backscatter signatures of objects of different measurements, according to an embodiment.

FIG. 3 is an illustration of multiple SAR backscatter signatures of objects of different measurements, according to an embodiment. Illustrated are SAR backscatter signatures for floating roof containers in different states of fill level, including a full 310, empty 320, and two half full 330 and 340 fill levels. The fill level indicates the volume of material stored in the floating roof container. As the amount of material increases, its volume in the container increases, and thus the floating roof or lid of the container is raised higher, until the roof makes contact with the top surface of the stored material in the container.

In each of the illustrated backscatter signatures, three roughly circular shapes are illustrated. Each of these is a label indicating the locations of the top, lid, and bottom of the floating roof container. These labels may be provided by a human, for example, by determining where the reflections indicated in the backscatter signature indicate three roughly circular shapes. The labels may also be provided via some other means, such as by correlating to an optical image of the same container. The machine learning model 155 may be trained to generate coordinates on the backscatter signatures that correspond to points on these circular labels, as described above.

In the full 310 example, the label 360A indicating the lid of the container is near to the label 350A indicating the top of the container. This is because as the SAR device 110 "looks" down upon the container from an angle, the closer the lid is to the top of the container, the closer in distance the lid is to the SAR device 110, and therefore, the closer the backscatter signature indication is for the lid to the SAR device 110. As the top of the container is closest to the SAR device 110, a full container would have a lid that is near the top of the container, and therefore the reflection from the lid creates the backscatter signature indication that is near the backscatter signature indication for the top. In the full 310 example, the portions of the backscatter signature nearer to the left side of the figure indicate reflections against objects that are closer to the SAR device 110, while the portions of the backscatter signature nearer the right side of the figure indicate reflections against objects that are further away from the SAR device 110. As the SAR device may be both above and to the side of the container, this distance includes both a vertical and horizontal component. Thus, the bottom of the container, indicated by the label 370A, while not more horizontally distant from the top of the container, is nevertheless more vertically distant, and thus the reflection of the bottom appears to the right of the reflection of the top of the container in the backscatter signature.

In the empty 320 example, the reflection of the lid is now shown to be near the reflection of the bottom. Therefore, the label 360B of the lid is near the label 370B of the bottom, and not near the label 350B of the top.

In the half full 330 example, the label 360C for the lid is in-between the label 350C for the top and the label 370C for the bottom. This is because the container is half full, and so the lid is in-between the top and bottom of the container. Note that backscatter signatures for other containers, at the bottom left and right of the image, are shown but these are not considered as they do not form a full circular (or roughly circular) shape.

In the half full 340 example, the positioning of the labels 350D-370D is similar to that of the half full 340 example. However, there are no other artifacts in the image, such as the backscatter signatures from other containers.

Using the labeling method shown here, many images of containers may be labeled in order to train the machine learning model as described above. The machine learning model may in turn generate coordinates based on the training from these labeled images.

Example Block and Flow Diagram for Determining Object Measurements

Figure 4:
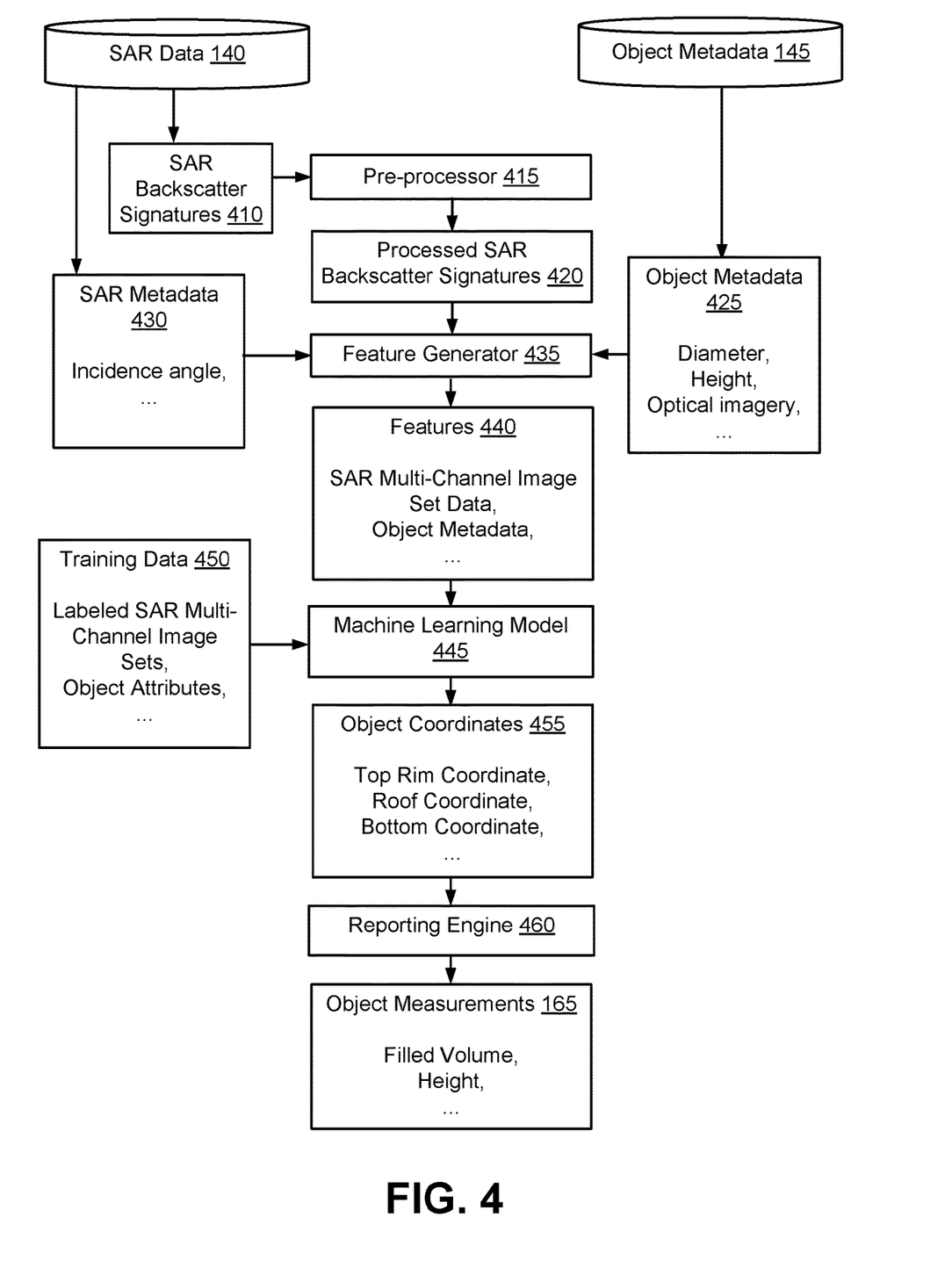
FIG. 4 is a block diagram illustrating an example flow for object measurement using deep learning analysis of synthetic aperture radar (SAR) backscatter signatures, in accordance with an embodiment.

FIG. 4 is a block diagram illustrating an example flow for object measurement using deep learning analysis of synthetic aperture radar (SAR) backscatter signatures, in accordance with an embodiment.

As described above, one or more SAR backscatter signatures 410, such as those depicted in FIG. 3, may be received and stored at the SAR data store 140. These SAR backscatter signatures 410 may take the form of a 2D array of intensity values, and may resemble an image. These images may be sent to a pre-processor 430, which may detect locations having objects in the images, crop, scale, rotate, skew, and otherwise modify the images before they are sent to the machine learning model 155 for processing. These may include the processing described above in relation to the feature generator 150 against the SAR backscatter signatures prior to transmitting them as features to the machine learning model 440. For example, the pre-processor may include a separate machine learning model to recognize areas of the images that have objects of interest, such that these portions can be cropped and used as features for the machine learning model. As another example, the pre-processor may separate the images into three images, each having a different channel indicating a different range of wavelengths captured, as noted above.

The feature generator 435 receives the processed SAR backscatter signatures 420 from the pre-processor 415, and also receives one or more object metadata 425 from the object metadata store 145. The object metadata 425 may include the dimensions, such as the diameter, of the object of interest, along with other information, such as optical imagery of the object, the type of object, its geolocation, etc. Additional attributes are noted above with regards to the feature generator 150. The feature generator 435 may also receive SAR metadata 430 from the SAR data store 140. This may include the incidence angle of the SAR device 110, its geolocation, etc. In one embodiment, the feature generator 435 is similar to the feature generator 150.

The feature generator 435 generates the features 440 for the machine learning model 445. These may take the form of vectors. The features 440 may include data such as the multi-channel SAR backscatter signature images, the metadata for the object of interest, the metadata for the SAR device, and so on. The feature generator 435 may extract portions of the multi-channel SAR backscatter signature images to be used as features, e.g., by generating a lower resolution version of the SAR backscatter signature images.

The features 440 are received by the machine learning model 445, which generates a set of object coordinates 455. The object coordinates indicate the coordinates of various points on the object. These coordinates may indicate the distance of the point from the SAR device 110, or may indicate a location in space. The machine learning model 445 may be trained using the training data 450, which may include labeled (ground truth) SAR images that indicate the object coordinates for the object of interest being used to train the model, along with other feature inputs such as the object metadata, SAR metadata, etc. In one embodiment, the machine learning model 445 is similar to the machine learning model 155.

The object coordinates 455 are received by the reporting engine 460, which may be similar to the reporting engine 160. The reporting engine 460 processes the object coordinates 455 to generate the object measurements 165, which, as described above, indicate various measurements for the object of interest, such as its filled volume, height, and so on.

Example Process for Identifying Remote Objects

Figure 5:
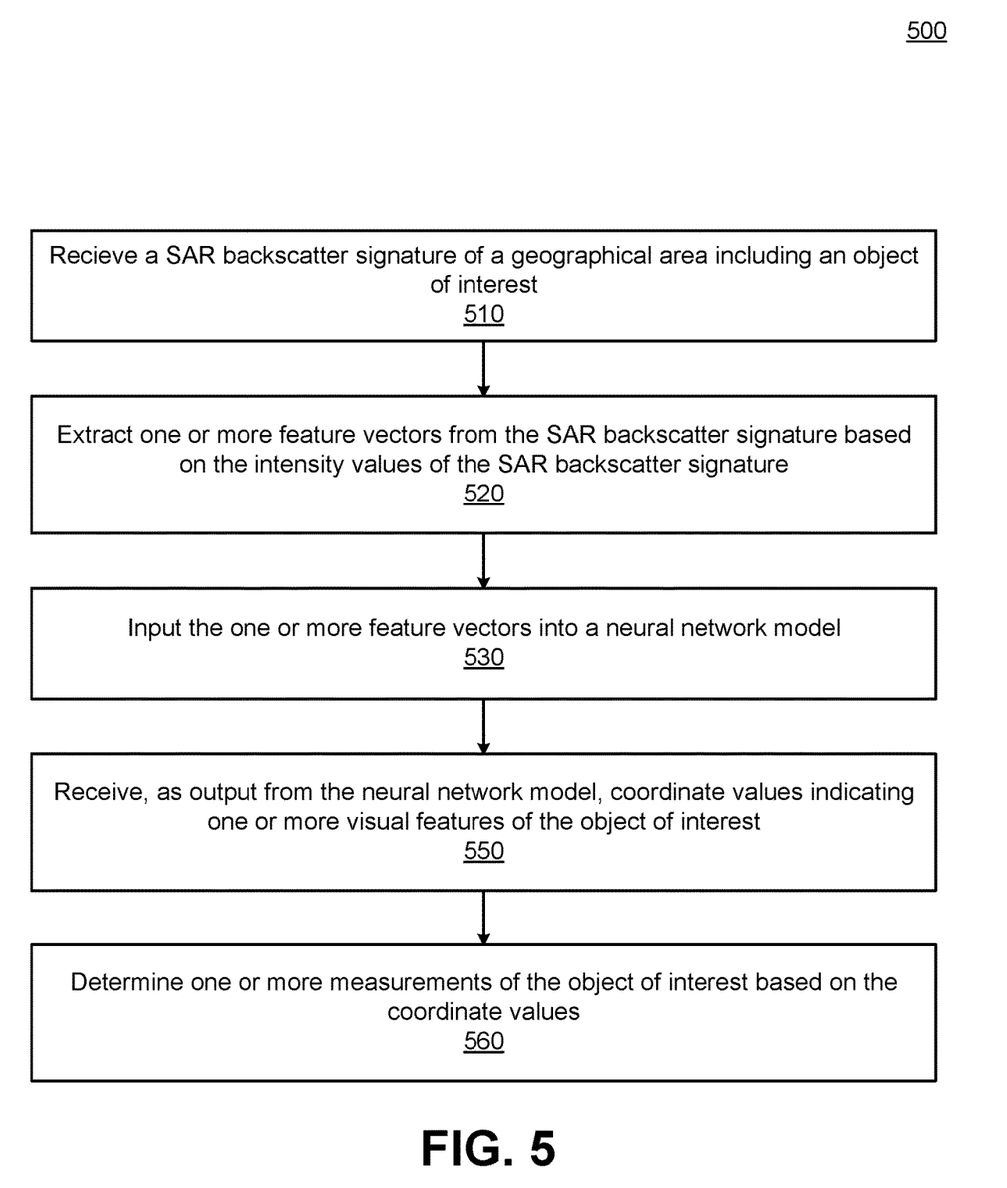
FIG. 5 is a flow diagram illustrating an exemplary process for object measurement using deep learning analysis of synthetic aperture radar (SAR) backscatter signatures, in accordance with an embodiment.

FIG. 5 is a flow diagram illustrating an exemplary process for object measurement using deep learning analysis of synthetic aperture radar (SAR) backscatter signatures, in accordance with an embodiment. In some example embodiments, the process may have different and/or additional steps than those described in conjunction with FIG. 5. Steps of the process may be performed in different orders than the order described in conjunction with FIG. 5. Some steps may be executed in parallel. Alternatively, some of the steps may be executed in parallel and some steps executed sequentially. Alternatively, some steps may execute in a pipelined fashion such that execution of a step is started before the execution of a previous step. In one embodiment, the process is performed by the object measurement system 135.

The object measurement system 135 receives 510 a SAR backscatter signature of a geographic area (e.g., geographic area 115) that includes an object of interest (e.g., object of interest 120). The object measurement system 135 extracts 520 one or more feature vectors from the SAR backscatter signatures based on the intensity values of the SAR backscatter signatures. The object measurement system 135 inputs 530 the one or more feature vectors into a neural network machine learning model, and receives 550, as output from the model, coordinate values indicating one or more visual features of the object of interest. The object measurement system 135 determines 560 one or more measurements of the object of interest based on the coordinate values.

Example Machine Architecture

Figure 6:
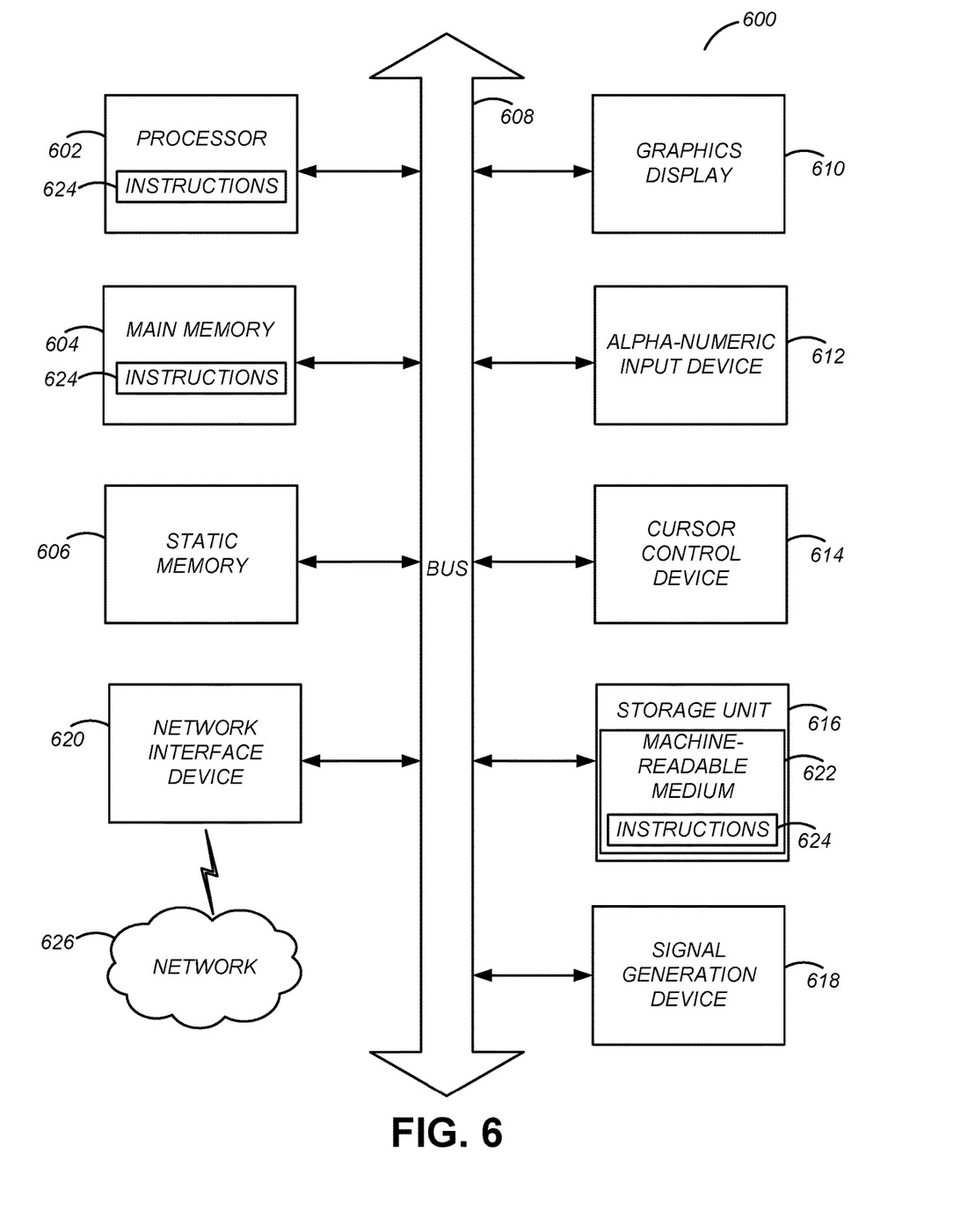
FIG. 6 is a block diagram illustrating components of an example machine able to read instructions from a machine-readable medium and execute them in a processor or controller, according to an embodiment.

FIG. 6 is a block diagram illustrating components of an example machine able to read instructions described as processes herein from a machine-readable medium and execute them in at least one processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein, e.g., with FIGS. 1-5. In alternative embodiments, the machine operates as a stand-alone device or a connected (e.g., networked) device that connects to other machines. In a networked deployment, the machine may operate in the capacity of a server machine or a client machine in a server-client network environment, or as a peer machine in a peer-to-peer (or distributed) network environment. It is noted the instructions correspond to the functionality of components and/or processes described herein, for example, with respect to the figures above.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media. It is noted that in some example embodiments, the core components of the computer system may disregard components except for the processor 602, memory 604, and bus 608 and may in other embodiments also include the storage unit 616 and/or the network interface device 620.

Additional Considerations

Using such a system, measurements for an object of interest can be gathered at regular intervals with a more guaranteed observance cadence due to being able to penetrate atmospheric obstructions. In addition, the system can provide more accurate measurements, and work over a longer range compared to optical systems.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described in the figures above. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for the system described above. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for processing synthetic aperture radar (SAR) signatures from a SAR device, the method comprising:
    receiving an SAR backscatter image representing an SAR backscatter signature of a geographical area including an object of interest at a given time, the SAR backscatter signature including a two dimensional array of intensity values;
    modifying the SAR backscatter image by removing portions of the SAR backscatter image until the object of interest is within a threshold value of a center of the image;
    extracting one or more features from the modified SAR backscatter image based on intensity values of the modified SAR backscatter image;
    inputting the one or more features into a neural network model, the neural network model trained using training data, the training data including one or more training sets, each training set comprising labeled SAR backscatter signatures of objects of interest;
    receiving, as an output from the neural network model, coordinate values indicating one or more visual features of the object of interest; and
    determining one or more measurements of the object of interest based on the coordinate values, wherein each of the one or more measurements characterize a state of the object of interest at the given time.

2. The method of claim 1, further comprising receiving metadata from the SAR device describing information about the SAR device and the SAR backscatter image, the metadata including an incidence angle of the SAR device.

3. The method of claim 1, wherein the one or more measurements are generated by the neural network model.

4. The method of claim 1, wherein the object of interest is a floating roof container, and wherein the one or more measurements includes a fill amount of the floating roof container.

5. The method of claim 1, further comprising:
receiving object metadata describing the object of interest, the object metadata including values indicating one or more dimensions of the object of interest.

6. The method of claim 5, wherein the values include a diameter of the object of interest.

7. The method of claim 1, further comprising:
dividing the SAR backscatter signature into a plurality of channels, each channel including data from a subset of a range of intensity values included in the SAR backscatter signature;
generating for each channel of the plurality of channels, a subset SAR backscatter signature including data from the channel; and
generating the one or more features based on the plurality of subset SAR backscatter signatures.

8. The method of claim 1, wherein the object of interest is a floating roof container, and wherein the coordinate values indicate coordinates for points on the top, lid, and bottom of the floating roof container as represented in the SAR backscatter signature, the coordinate values indicating a distance from each respective point to the SAR device.

9. The method of claim 1, wherein the neural network model is further trained to determine whether the object of interest exists in the modified SAR backscatter image, the method further comprising:
determining that the object of interest does not exist in the modified backscatter image in response to the neural network model being unable to identify the center of the object of interest.

10. The method of claim 1, wherein extracting one or more features from the modified SAR backscatter image comprises:
responsive to determining that the object of interest is not radially symmetrical, accessing additional information regarding the orientation of the object of interest; and
rotating the input to have a standard orientation.

11. The method of claim 1, further comprising:
verifying, for each output coordinate value, whether an intensity value of the output coordinate value exceeds a threshold value; and
determining that the SAR backscatter image does not contain the object of interest in response to determining that no output coordinate value has an intensity value exceeding the threshold value.

12. A system, comprising:
a synthetic aperture radar (SAR) device to capture an SAR backscatter image representing an SAR backscatter signature of a geographic area that includes an object of interest at a given time, the SAR back scatter signature including two dimensional array of intensity values; and
an object measurement system configured to:
receive the SAR backscatter image;
modify the SAR backscatter image by removing portions of the SAR backscatter image until the object of interest is within a threshold value of a center of the image;
extract one or more features from the modified SAR backscatter image based on the intensity values of the modified SAR backscatter image;
input the one or more features into a neural network model, the neural network model trained using training data, the training data including one or more training sets, each training set comprising labeled SAR backscatter signatures of objects of interest;
receive, as an output from the neural network model, coordinate values indicating one or more visual features of the object of interest; and
determine one or more measurements of the object of interest based on the coordinate values, wherein each of the one or more measurements characterize a state of the object of interest at the given time.

13. The system of claim 12, wherein the object measurement system is further configured to receive metadata from the SAR device describing information about the SAR device and the SAR backscatter image, the metadata including an incidence angle of the SAR device.

14. The system of claim 12, wherein the object of interest is a floating roof container, and wherein the one or more measurements includes a fill amount of the floating roof container.

15. The system of claim 12, wherein the object measurement system is further configured to:
receive object metadata describing the object of interest, the object metadata including values indicating one or more dimensions of the object of interest.

16. The system of claim 15, wherein the values include a diameter of the object of interest.

17. The system of claim 12, wherein the object measurement system is further configured to:
divide the SAR backscatter signature into a plurality of channels, each channel including data from a subset of a range of intensity values included in the SAR backscatter signature;
generate for each channel of the plurality of channels, a subset SAR backscatter signature including data from the channel; and
generate the one or more features based on the plurality of subset SAR backscatter signatures.

18. The system of claim 12, wherein the object of interest is a floating roof container, and wherein the coordinate values indicate coordinates for points on the top, lid, and bottom of the floating roof container as represented in the SAR backscatter signature, the coordinate values indicating a distance from each respective point to the SAR device.

19. A non-transitory computer readable storage medium, storing computer-readable instructions, that when executed by a processor of a computing system, causes the processor to:
receive an SAR backscatter image representing an SAR backscatter signature of a geographical area including an object of interest at a given time, the SAR backscatter signature including a two dimensional array of intensity values;
modify the SAR backscatter image by removing portions of the SAR backscatter image until the object of interest is within a threshold value of a center of the image;
extract one or more features from the modified SAR backscatter image based on intensity values of the modified SAR backscatter image;
input the one or more features into a neural network model, the neural network model trained using training data, the training data including one or more training sets, each training set comprising labeled SAR backscatter signatures of objects of interest;
receive, as an output from the neural network model, coordinate values indicating one or more visual features of the object of interest; and
determine one or more measurements of the object of interest based on the coordinate values, wherein each of the one or more measurements characterize a state of the object of interest at the given time.

* * * * *